United States Patent
Kraai

(10) Patent No.: US 7,690,673 B1
(45) Date of Patent: Apr. 6, 2010

(54) SELF-LATCHING BALL CLAMP COUPLER

(75) Inventor: Jason J. Kraai, Hull, IA (US)

(73) Assignee: Dethmers Manufacturing Company, Boyden, IA (US)

( * ) Notice: Subject to any disclaimer, the term of this patent is extended or adjusted under 35 U.S.C. 154(b) by 750 days.

(21) Appl. No.: 11/291,601

(22) Filed: Dec. 1, 2005

(51) Int. Cl.
*B60D 1/60* (2006.01)

(52) U.S. Cl. ............... 280/507; 280/508; 280/511; 280/513

(58) Field of Classification Search .......... 280/507, 280/511, 513, 508, 510
See application file for complete search history.

(56) References Cited

U.S. PATENT DOCUMENTS

| | | | | |
|---|---|---|---|---|
| 2,166,208 A | * | 7/1939 | Dayton | 280/513 |
| 2,170,980 A | * | 8/1939 | Thorp et al. | 280/512 |
| 2,178,094 A | * | 10/1939 | Berluti | 280/513 |
| 2,204,882 A | * | 6/1940 | Berluti | 280/511 |
| 2,435,024 A | * | 1/1948 | Wagner | 280/512 |
| 2,523,500 A | * | 9/1950 | Davey et al. | 280/513 |
| 2,823,931 A | * | 2/1958 | Schrader | 280/513 |
| 3,139,291 A | * | 6/1964 | Geresy | 280/507 |
| 3,770,298 A | * | 11/1973 | Phillips | 280/457 |
| 3,888,517 A | * | 6/1975 | Ray | 280/512 |
| 3,954,286 A | * | 5/1976 | Weber | 280/512 |
| 4,763,917 A | | 8/1988 | Chambers | |
| 4,776,607 A | | 10/1988 | Richter et al. | |
| 5,133,572 A | | 7/1992 | Polito | |
| 5,147,096 A | | 9/1992 | Rogers | |
| 5,344,174 A | | 9/1994 | Sanders | |
| 5,632,501 A | | 5/1997 | Jackson et al. | |
| 5,683,094 A | | 11/1997 | Gullickson | |
| 6,234,509 B1 | | 5/2001 | Lara | |
| 6,286,853 B1 | | 9/2001 | Lauzon | |
| 6,352,279 B1 | | 3/2002 | Ebey | |
| 6,419,259 B1 | * | 7/2002 | Brown et al. | 280/512 |
| 6,481,740 B1 | | 11/2002 | Haase et al. | |
| 6,485,045 B1 | | 11/2002 | King | |
| 6,485,046 B1 | | 11/2002 | Hsueh et al. | |
| 6,494,478 B1 | | 12/2002 | MacKarvich | |
| 6,497,428 B2 | | 12/2002 | Ross | |
| 6,505,849 B1 | * | 1/2003 | Ebey | 280/513 |
| 6,536,794 B2 | | 3/2003 | Hancock et al. | |
| 6,540,426 B2 | | 4/2003 | Cloyd et al. | |
| 6,547,271 B2 | | 4/2003 | Kleb et al. | |
| 2007/0018430 A1 | * | 1/2007 | Goettker | 280/511 |

* cited by examiner

*Primary Examiner*—Lesley Morris
*Assistant Examiner*—Maurice Williams
(74) *Attorney, Agent, or Firm*—Dorsey & Whitney LLP; Brian J. Laurenzo; Jason M. Hunt

(57) ABSTRACT

A ball hitch coupler permits self-latching with a ball hitch. The ball hitch coupler has a housing with a generally downwardly facing open socket for receiving a ball hitch. A ball clamp member within the open socket is attached to an adjustment lever by a clamp rod that extends through a top surface of the housing. A camming surface provided on the lever causes the clamp rod to pull the ball clamp member upwardly and outwardly from the socket as the lever is pivoted to an open position. When the lever is in a neutral ready position, a ball hitch may be inserted into the socket and will automatically be coupled with the ball hitch coupler without further adjustment.

11 Claims, 5 Drawing Sheets

SELF-LATCHING BALL CLAMP COUPLER

FIELD OF INVENTION

This invention relates generally to coupling mechanisms, and more specifically, ball clamp couplers for engaging ball hitches.

BACKGROUND

Ball and socket type couplers are commonly used to couple a towed vehicle to a towing vehicle. Generally, the towing vehicle will include a ball hitch located somewhere on the rear of the vehicle. The vehicle to be towed includes a coupler housing that includes a socket for engaging the ball hitch. A latching mechanism is associated with the housing to retain the ball within the socket during towing.

Commonly, the latching mechanism will include a handle, or lever, that can be adjusted between and open position that permits the ball to be inserted and removed from the socket, and a closed position that retains the ball within the socket. Typically, a user must adjust the lever to the open position in order to place the socket in engagement with the ball.

For example, Ebey, U.S. Pat. No. 6,505,849 discloses a latching mechanism that has an adjustable lever pivotally connected to the socket housing. A shaft is pivotally connected to one end of the lever and extends downwardly into the housing and has a ball clamp fixed at its far end. The ball clamp is moved into and out of locking position by rotation of the lever. The ball hitch cannot be inserted into the housing when the lever is in the latched position. Therefore, user must adjust the lever into the open position in order to couple the housing to the ball, and then adjust the lever into the closed latched position in order to lock the ball in place within the housing.

Therefore, there exists a need for a ball coupler mechanism that will permit automatic latching of the ball within the coupler housing, without the need to adjust the latch mechanism to an open position and then to a closed position after the ball has been inserted.

It is therefore an object of the present invention to provide a ball coupler mechanism that is self-latching.

SUMMARY OF THE INVENTION

According to one embodiment of the present invention, a ball coupler mechanism is provided that includes a housing for receiving a ball hitch. The housing includes a generally downward facing open socket for receiving a ball hitch. A top surface of the housing is provided with an opening through which a clamp rod extends. A ball clamp member is provided near a bottom end of the clamp rod, and the clamp rod is pivotally connected to a latching lever near its top end that extends outwardly above the top surface of the housing. A biasing mechanism, such as a spring, is provided between the ball clamp and a generally downward facing inner surface of the coupler housing to urge the ball clamp generally downward to a clamping position. The lever is adjustable between an open position, wherein the clamp rod is adjusted to an upper position, and a closed position, wherein the rod is moved to a lower position such that the ball clamp is in the clamping position. A bottom plate may be provided across the open downward facing portion of the coupler rearwardly from the ball socket. This bottom plate prevents movement of the ball clamp downward past the clamping position. The lever may be provided with a cam surface that presses against the top surface of the coupler housing to provide the relative inward and outward movement of the clamp rod as the lever is adjusted. The lever may rotate about the cam surface such that when it is in the open position, it is in an over center orientation such that it retains itself in the open position. A locking mechanism may be provided to lock the lever in the latched position.

DETAILED DESCRIPTION OF PREFERRED EMBODIMENTS

Shown generally in the figures are embodiments of a ball hitch coupler 10 for use in coupling a towed vehicle to a towing vehicle. The coupler 10 is adapted to receive a ball hitch and latch in a towing configuration without adjustment of the mechanism.

Figure 1:
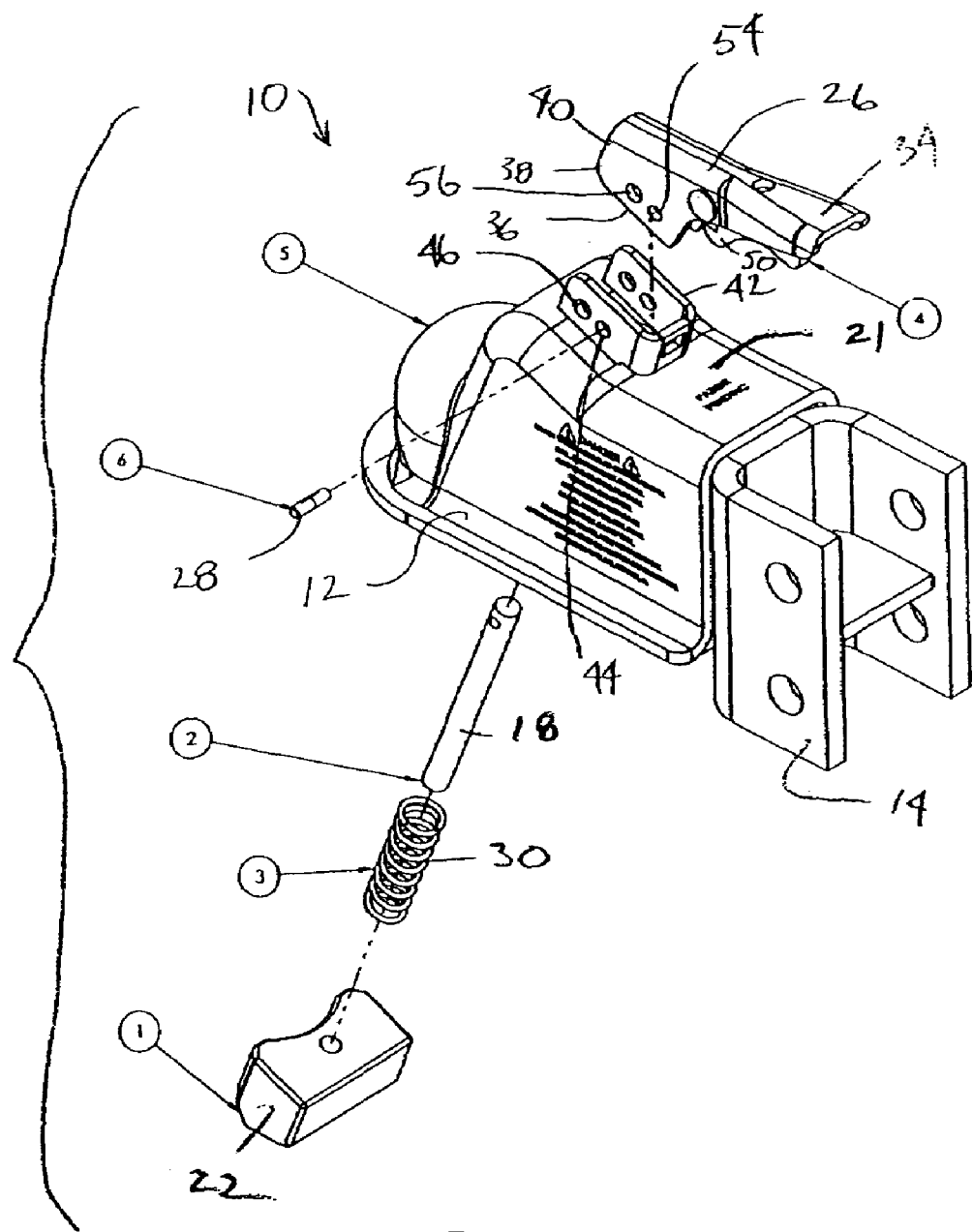
FIG. 1 is a exploded isometric view of a ball hitch coupler according to one embodiment of the present invention.
Figure 2:
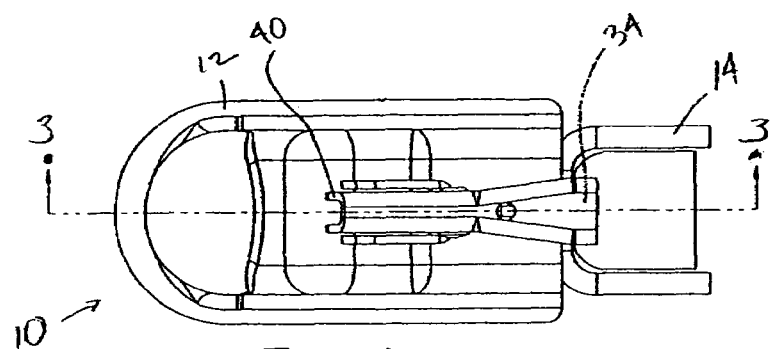
FIG. 2 is a top plan view of a ball coupler according to the embodiment of FIG. 1.

FIG. 1 shows an exploded view of a ball hitch coupler 10 according to one embodiment of the present invention. A housing 12 is secured to a bracket 14. The bracket 14 may be a portion of a trailer or other type of towed vehicle, or may be suitable for connection either directly or indirectly to such a trailer or other towed vehicle. The bracket 14 is secured to the housing 12 by welding, bolting or other known mechanisms.

The housing 12 is formed with a downwardly facing open socket 16 that is preferably contoured to receive and mate with a ball hitch. A clamp rod 18 extends through an opening 20 formed in a top surface 21 of the housing 12. The clamp rod 18 is located near the rear of the open socket 16. The clamp rod 18 should be relatively rigid and inelastic so that it will readily transmit tension and compression forces. A ball clamp member 22 is secured to a lower end of the clamp rod 18. A ball clamp member 22 includes a front face 24 that is contoured to mate with and engage a ball hitch seated within the socket 16.

A lever 26 is pivotally mounted to the top portion of the clamp rod 18 that extends above the top surface 21 of the housing 12. A pin 28 may be used to act as the pivot member to connect the lever 26 with the clamp rod 18. A biasing mechanism such as coil spring 30 is provided between an inner face 32 of the housing 12 and the ball clamp member 22 in order to urge the ball clamp member 22 downwardly towards a clamping position.

The lever 26 includes a handle portion 34 for selectively adjusting the lever 26. The spring 30 pulling against the clamp rod 18 holds the lever 26 firmly against the top surface 21 of the housing 12. The front portion of the lever 26 includes a locking surface 36 that is held against the top surface 21 when the ball clamp member 22 is in the lowered locking position, a camming surface 38 that engages the top surface 21 as the lever 26 is adjusted, and a generally flat open position surface 40 that engages the top surface 21 when the clamp member 22 is raised to an upper open position. The camming surface 38 is contoured such that as the lever 26 is rotated towards the open position, the point of attachment for the clamp rod 18 is moved generally upwardly above the top surface 21. The opening position surface 40 is preferably generally flat in order to retain the lever 26 in the open position.

A U-shaped bracket 42 is provided on the top surface 21 of the housing 12 with the opening 20 between the legs of the U-shaped bracket 42. Each leg of the U-shaped bracket 42 includes an assembly hole 44 and a locking hole 46. The base portion of the U-shaped bracket 42 includes an opening that has a top surface 48 that acts as a latching surface.

A latching member 50 is pivotally mounted within the lever 26 near the handle portion 34 of the lever 26. The latch member 50 includes a catch 52 for engagement with the latching surface 48 of the U-shaped bracket 42. Preferably, though not shown, a spring or other urging means is positioned between the latch member 50 and the lever 26 to bias the rear portion of the latch member 50 downward towards a latching position. The lever 26 includes a pair of pivot openings 54 for receiving pivot member 28 to pivotally mount the lever 26 to the clamp rod 18. During assembly, the pivot openings 54 align with the assembly holes 44 so that the pivot pin 28 may be inserted through the assembly holes 44 into engagement with the clamp rod 18 and the pivot openings 54. Alternatively, the assembly holes 44 may be eliminated and the pivot pin 28 may be inserted by pushing the rod 18 upwardly so that the top portion of the rod 18 extends above the U-shaped bracket 42 for assembly. Elimination of the assembly holes 44 may be advantageous because it assures that the pivot pin 28 cannot work loose and fall out through the pivot openings 44 during use.

The lever 26 is also provided with a pair of locking openings 56. These locking openings 56 align with locking holes 46 in the U-shaped bracket 42 when the lever 26 is in a locked position. A locking member (not shown), such as a locking pin or the shackle portion of a padlock may be positioned within the locking opening 56 and locking hole 46 to retain the lever 26 in the locked position. A padlock may be used in order to secure against theft of the towed vehicle by an unauthorized decoupling.

A ball clamp wall 58 is provided generally transversely to the open socket 16 within the housing 12, and is preferably mounted to angle downwardly and forwardly towards the front of the open socket 16. The ball clamp wall 58 may be welded, or otherwise fastened, to the inner surfaces 32 of the housing 12. A bottom plate 60 is attached across the bottom of the housing 12 to provide support for the ball clamp wall 58 and to enclose the housing 12 rearward from the open socket 16. The bottom plate 60 further provides a bearing surface for the ball clamp member 22 to support the ball clamp member 22 at its lowest extent, and to hold it in close contact with the ball 62. The bottom plate 60 should be fastened securely enough to the housing 12 to support the ball clamp member 22 when the ball 62 presses downwardly against ball clamp member 22 during towing.

The ball clamp member 22 should be fastened to the rod 18 so that open position surface 40 just touches the top surface 21 of the housing 12 when the ball clamp member 22 is against the bottom plate 60, so that all, or substantially all of the weight of the ball 62 is applied to the bottom plate 60 instead of the pivot pin 28. An adjustment mechanism may be provided to adjust the position of the clamp member 22 during installation to insure that this position is achieved. For example, the lower portion of the rod 18 may be threaded and provided with an adjustment nut (not shown) at its lower end to fine tune the location of the clamp member 22 on the rod 18. Alternatively, the rod 18 may be internally threaded and a bolt (not shown) may be provided axially at the lower end of the rod 18 for similar effect. Alternatively the clamp member 22 may be fixedly attached to the rod 18 by pinning, welding or other known mechanism.

Figure 3:
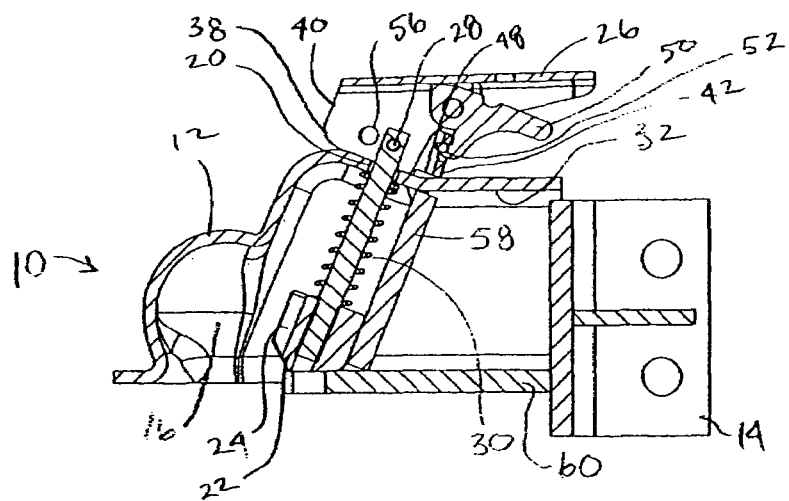
FIG. 3 is a cross sectional view of the ball coupler of FIG. 2 taken along line 3-3 of FIG. 2.
Figure 4:
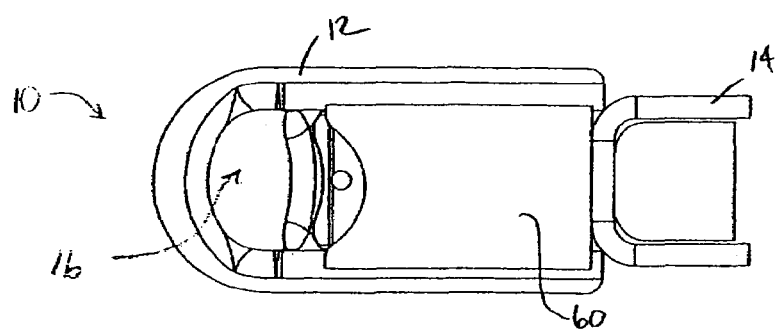
FIG. 4 is a bottom plan view of the ball hitch coupler of FIG. 2.

FIG. 3 shows the ball hitch coupler 10 in a neutral position ready for insertion of a ball hitch. The lever 26 is in a locking position with its locking surface 36 flush against the top surface 21 of the housing 12. The ball clamp member 22 is at its lowest extent resting against the bottom plate 60.

Figure 5:
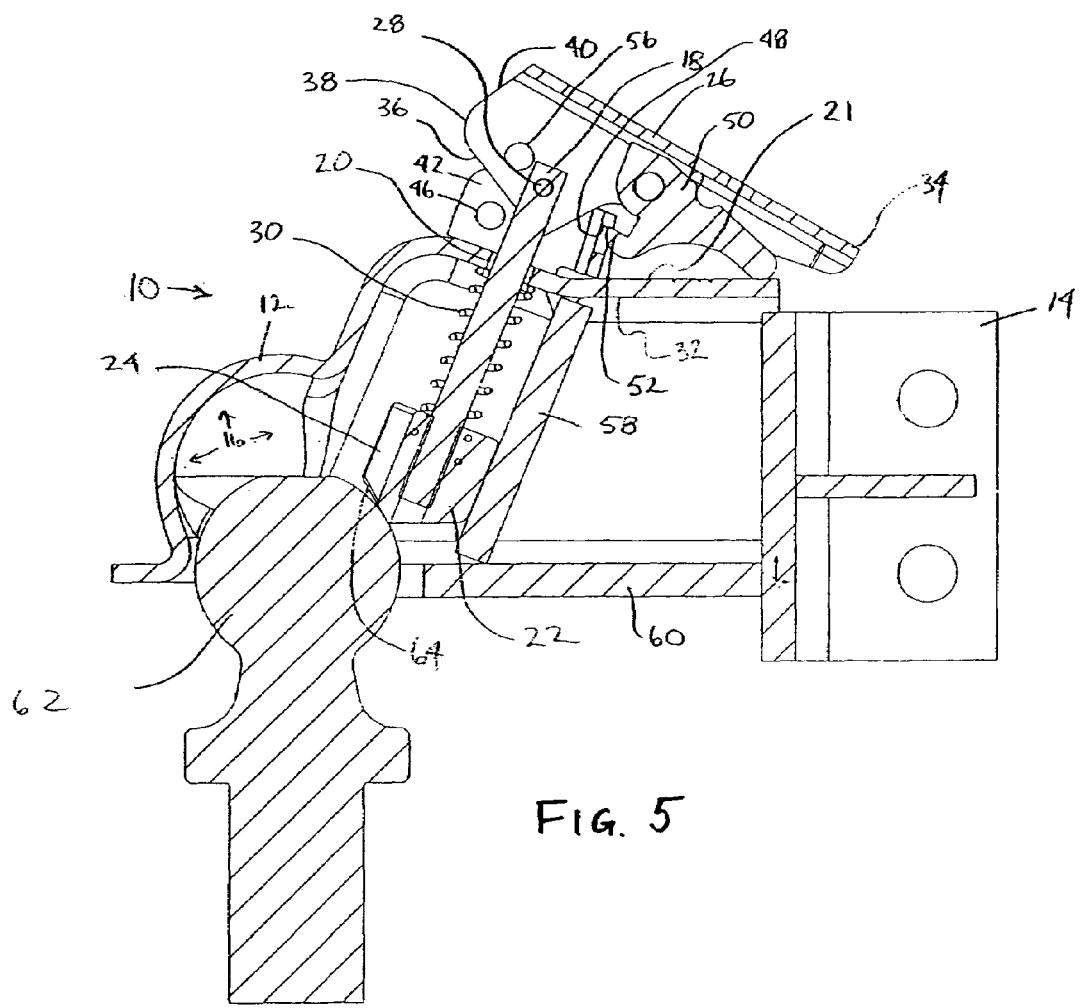
FIG. 5 is a cross-sectional view of the embodiment of FIG. 2 with a ball hitch being inserted into the coupler and with the latching lever tilted towards a self-latching orientation.

FIG. 5 shows the ball hitch coupler 10 as a ball hitch 62 is inserted into the open socket 16 during a self-latching procedure. As the ball hitch 62 is inserted into the open socket 16, typically by lowering the ball hitch coupler 10 onto the ball hitch 62, though possibly by lifting the ball hitch 62 into the open socket 16, an upper portion of the ball hitch 62 presses against a tapered lower surface 64 of ball clamp member 22 which pushes the ball clamp member 22 upwardly against the resistance of coil spring 30 generally towards the top of the housing 12. The tapered lower surface 64 of the ball clamp member 22 helps the guide the ball hitch 62 forwardly into the proper location within the open socket 16. As the ball clamp member 22 slides up the ball clamp wall 58 towards the top of the housing 12, the clamp rod 18 is also thereby driven upwardly and out through the opening 20 in the top surface 21 of the housing 12. Accordingly, the front portion of the lever 26 that is pivotally connected to the top of the rod 18 is also driven generally upwardly away from the top surface 21 of the housing 12. The lever 26 is thereby pivoted about the catch 52 which is in contact with latching surface 48 so that the lever 26 rotates generally clockwise in the view shown from the locking position of FIG. 3 to the self-latching position of FIG. 5.

Eventually during insertion of the ball hitch 62 into the open socket 16 during a self-latching procedure, the ball clamp member 22 is driven sufficiently rearward along the sloped ball clamp wall 58 that the ball hitch 62 clears the tapered lower surface 64 of the ball clamp member 22. Once the ball clamp member 22 is cleared from the ball hitch 62, the coil spring 30 pressing between the inner surface 32 of the housing 12 and the ball clamp member 22 will urge the ball clamp member 22 downwardly and forwardly underneath the lower portion of ball hitch 62 to the locking position shown in FIG. 6.

Figure 6:
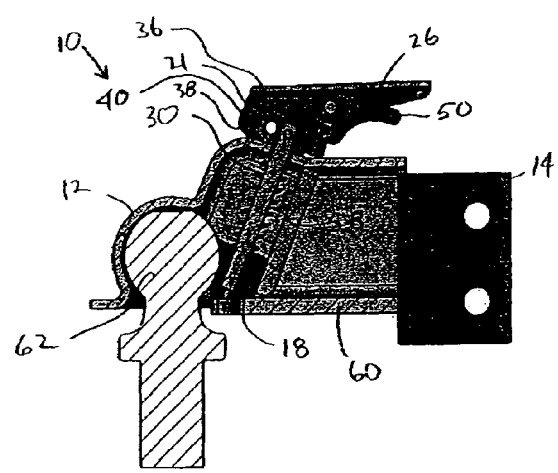
FIG. 6 is a cross sectional view of the ball hitch coupler of FIG. 5 with the ball hitch fully inserted into the coupler and the lever in a latched position.

In the locking position of FIG. 6 the ball hitch 62 is fully received within the socket 16. The front face 24 of the ball clamp member 22 engages the underside of ball hitch 62. The ball clamp member 22, and hence the ball hitch 62, are constrained from moving relatively downwardly with respect to the housing 12 by the bottom plate 60. The locking surface 36 of the lever 26 is flush against the top surface 21 of the housing 12. The clamp rod 18 is thereby also constrained against a downward movement relative to the housing 12 by virtue of the locking surface 36 bearing against the top surface 21. As the ball clamp member 24 slides downwardly and forwardly past the ball hitch 62 during auto-latching the lever 26 correspondingly rotates about the catch 52 on latching surface 48 back to the locking position shown in FIG. 6.

With the ball hitch 62 secured within the open socket 16 by the ball clamp member 22 in the locking position of FIG. 6, the ball hitch coupler 10 is effectively coupled with the ball hitch 62 to permit towing of a trailer, or other towed vehicle attached to the ball hitch coupler 10, for example by bracket 14, by a towing vehicle on which the ball hitch 62 is mounted. Catch 52 is restrained by latching surface 48 to prevent the handle portion of the lever 26 from being rotated upwardly away from the top surface 21 of the housing 12. As discussed above, preferably before use in towing using the ball hitch coupler 10, a locking pin will be inserted through the locking hole 46 in the U-shaped bracket 42 and the locking openings 56 in the lever 26 so that the lever 26 is securely locked against inadvertent rotation of the lever 26. It should be appreciated that any such locking member would need to be disengaged from the locking holes and locking openings 56 to permit the self-latching procedure.

Figure 7:
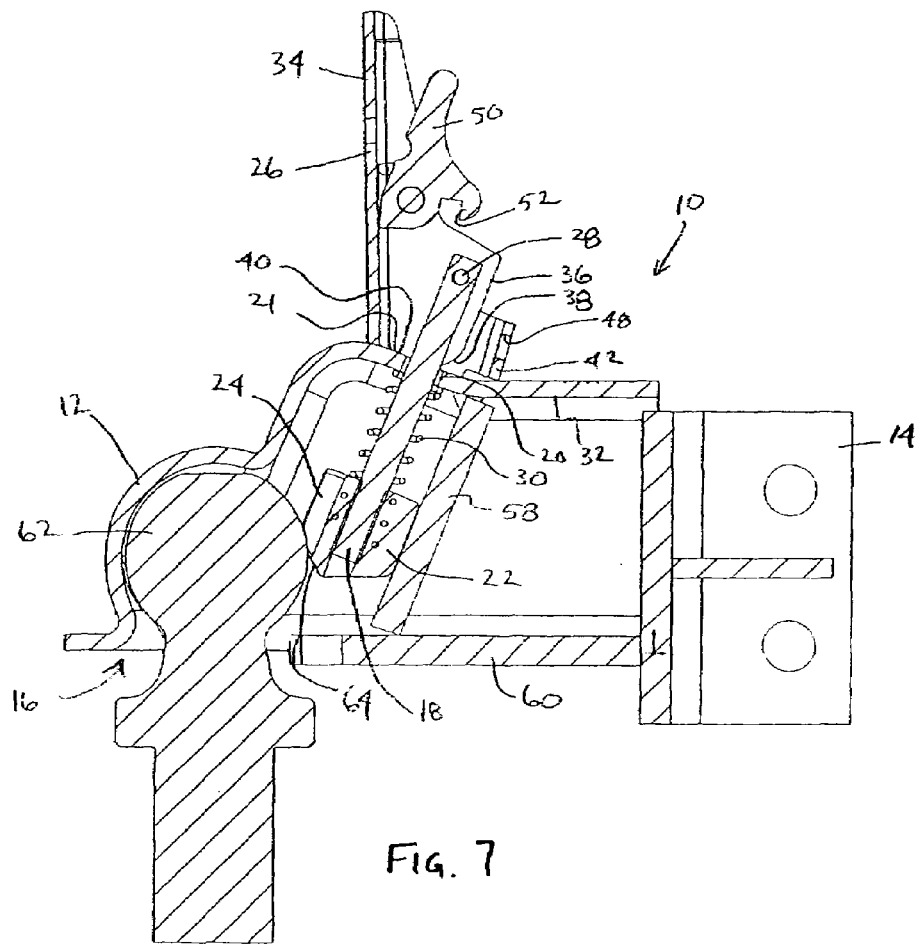
FIG. 7 is a cross sectional view of the ball hitch coupler of FIG. 6 with the lever adjusted into an unlatched position.

In order to de-couple the ball hitch 62 from the ball hitch coupler 10, the lever 26 is adjusted into an open position as shown in FIG. 7. This open position is achieved by first removing any locking member from the locking holes 46 and locking openings 56. The catch 52 must be cleared from the latching surface 48, for example by squeezing the latch member 50 towards the handle portion 34 of the lever 26. Once the catch 52 is clear from the latching surface 48, the handle portion 34 of the lever 26 may be pulled generally upwardly away from the top surface 21 of the housing 12 so that the lever 26 rotates in a generally counterclockwise direction in the view shown in FIGS. 6 and 7. As the lever 26 rotates between the locked position of FIG. 6 towards the open position of FIG. 7, the camming surface 38 of the lever 26 bears against the top surface 21 of the housing 12 causing the clamp rod 18 to be withdrawn generally upwardly and outwardly through the opening 20, which correspondingly causes the ball clamp member 22 to slide upwardly and rearwardly along sloped ball clamp wall 58. Eventually the lever 26 is rotated until the flat open position surface 40 of the lever 26 is flush against the top surface 21 of the housing 12. Preferably, in the open position of FIG. 7 the lever 26 is rotated over center with respect to the spring 30, such that the coil spring 30 tends to retain the lever 26 in the open position with the open position surface 40 flush against the top surface 21. In the open position of FIG. 7 the ball clamp member 22 is withdrawn sufficiently rearwardly along the sloped ball clamp wall 58 that the ball hitch 62 is clear from the front face 24 of the ball clamp member 22 such that the ball hitch 62 may be withdrawn from the socket 16, either by lowering the ball hitch 62 relative to the ball hitch coupler 10, or more commonly by lifting the ball hitch coupler 10 off of the ball hitch 62, or by some combination of relative movement between the ball hitch 62 and ball hitch coupler 10. Typically a jack (not shown) will be supplied on the trailer side of the hitch that can be used to raise and lower the coupler 10. During de-coupling it may be desirable to adjust the jack to take some of the weight of the trailer before adjusting lever 26 to the open position in order to facilitate movement of the clamp member 22, which may be pinched against the bottom plate 60 and rear wall 58 by the ball 62.

The ball hitch coupler 10 can be simply adjusted back to the ready position of FIG. 3 from the open position of FIG. 7 by pushing the handle portion 34 of lever 26 generally rearwardly and downwardly. The coil spring 30 will naturally urge the lever 26 back into the position of FIG. 3. To facilitate this, the bottom edge of the latch member 50 should be contoured such that it rides along the top of the U-shaped bracket 42 to urge the latch member 50 rearwardly until the catch 52 is clear from the U-shaped bracket 42 so that it can snap into the opening on the rear of the U-shaped bracket 42 to bring the catch 52 into engagement with latching surface 48. With the ball hitch coupler returned to the configuration of FIG. 3, the ball hitch coupler 10 is ready to repeat the self-latching procedure.

It should be appreciated that it is not necessary to use the auto-latching procedure in order to couple a ball hitch 62 with the ball hitch coupler 10. Instead, the lever 26 could be adjusted to the open position of FIG. 7, the ball hitch 62 could then be inserted into the socket 16 while the lever 26 is in the open position. Once the ball hitch 62 is fully received into the open socket 16, the handle portion 34 of the lever 26 could be pushed generally downwardly and rearwardly, which would cause the ball clamp member 22 to be snapped into the closed position, as described above. It may be necessary for a user to verify that the catch 52 is positively engaging the latching surface 48.

Figure 8:
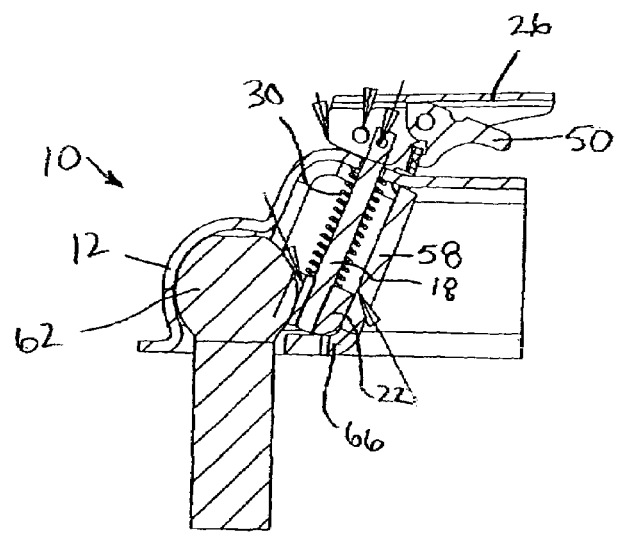
FIG. 8 is a cross sectional view of an alternative embodiment of a ball hitch coupler according to the present invention with a lip of the rear wall replacing the bottom plate.

FIG. 8 shows an alternative embodiment of a ball hitch coupler 10 according to the present invention wherein the bottom plate 60 has been eliminated and instead is replaced by a horizontally turned lip portion 66 of ball clamp wall 58. The embodiment of FIG. 8, the lip portion 66 of the ball clamp wall 58 constrains the ball clamp member 22 from downward movement when the lever 26 is adjusted to the closed position. The embodiment of FIG. 8 has the advantage of eliminating an additional part; however, it may provide less strength. Those of skill in the art will understand when the embodiment of FIG. 8 may be used according to the intended use of the ball hitch coupler 10.

Figure 9:
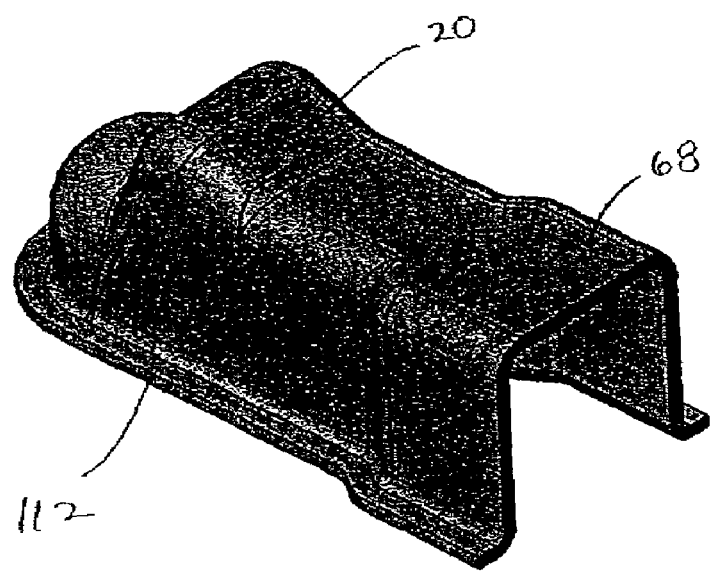
FIG. 9 is an isometric view of an alternative embodiment of a housing that can be used in conjunction with a ball hitch coupler according to the present invention.

FIG. 9 shows an embodiment of a housing 112 that may be used as part of the ball hitch coupler 10 according to the present invention. The housing 112 is preferably stamped from a single sheet of material, such as 5 gauge hardened steel. The opening 20 may be formed by stamping, or by drilling. A U-shaped bracket 42, such as previously discussed, may then be welded to a top surface 21 of the housing 112 surrounding the opening 20. The housing 112 includes a widened rear portion 68 to facilitate mounting to a trailer.

Figure 10:
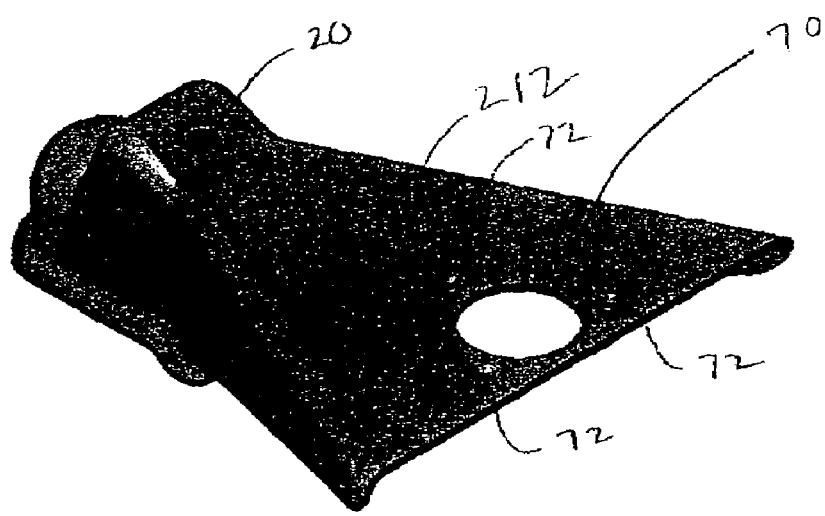
FIG. 10 is an isometric view of another alternative embodiment of a housing that may be used in conjunction with a ball hitch coupling mechanism according to the present invention.

FIG. 10 shows an additional embodiment of a housing 212 for use in forming a ball hitch coupler 10 according to the present invention. The housing 212 is provided with a large opening 70 and 3 mounting holes 72. The large opening 70 may be used to receive a jack post, or similar structure, that may be provided on a trailer, for example to raise and lower the ball hitch coupler 10. Fastening hardware, such as screws or bolts may be provided through the mounting holes 72 to secure the housing 212 to a trailer, or other towed vehicle.

Those of ordinary skill in the art will be aware of numerous configurations for the housing that would be suitable for use in conjunction with the ball hitch coupler 10 described herein. The size and shape of the components of the ball hitch coupler 10 may be chosen to accommodate the desired size and shape of a ball hitch 62, for example a ball hitch that is 2⁵⁄₁₆ inch in diameter. Additionally, the rear portion of the housing 12 may be configured in any of a variety of fashions to facilitate attachment to the trailer or other towed vehicle.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some' instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

I claim:

1. A self-latching coupling mechanism for coupling a towed vehicle to a ball hitch, the coupling mechanism comprising:
   a housing having a generally downwardly facing socket for receiving the ball hitch, said housing further including an upper wall located generally above said socket, said upper wall having an opening formed therethrough;
   a clamp rod slidably extending through said opening, said clamp rod including a bottom portion below said upper wall and an upper portion above said upper wall;
   a clamp member operably associated with said bottom portion of said clamp rod and movable between a locked position wherein said clamp member is extended downwardly into said socket to retain the ball hitch within the socket and an open position wherein said clamp member is positioned to permit movement of the ball hitch out of said socket;
   a lever pivotally connected to said upper portion of said clamp rod such that said lever is selectively adjustable to move said clamp member between said locked position and said open position;
   a biasing mechanism for biasing the clamp member toward the locked position the biasing mechanism permitting the clamp member to move upwardly upon relative movement of the ball hitch from below the socket towards the upper wall to permit the ball hitch to be inserted into the socket, the biasing mechanism further automatically moving the clamp member to the lower locking position upon complete insertion of the ball hitch into the socket, whereby the self-latching coupling mechanism is formed;
   further comprising a rear wall mounted within said housing, said clamp member being in a bearing sliding relation with said rear wall; and
   further comprising a bottom wall, said bottom wall supporting said clamp member against downward movement when said clamp member is in said locked position.

2. A self-latching coupling mechanism for coupling a towed vehicle to a ball hitch, the coupling mechanism comprising:
   a housing having a generally downwardly facing socket for receiving the ball hitch, said housing further including an upper wall located generally above said socket, said upper wall having an opening formed therethrough;
   a clamp rod slidably extending through said opening, said clamp rod including a bottom portion below said upper wall and an upper portion above said upper wall;
   a clamp member having a tapered lower surface, said clamp member operably associated with said bottom portion of said clamp rod and movable between a locked position wherein said clamp member is extended downwardly into said socket to retain the ball hitch within the socket and an open position wherein said clamp member is positioned to permit movement of the ball hitch out of said socket;
   a lever pivotally connected to said upper portion of said clamp rod such that said lever is selectively adjustable to move said clamp member between said locked position and said open position;
   a biasing mechanism for biasing the clamp member toward the locked position while said lever is maintained in the locked position, the biasing mechanism permitting the clamp member to move upwardly upon relative movement of the ball hitch from below the socket towards the upper wall to permit the ball hitch to be inserted into the socket while said lever is maintained in the locked position, the biasing mechanism further automatically moving the clamp member to the lower locking position upon complete insertion of the ball hitch into the socket while said lever is maintained in the locked position, whereby the self-latching coupling mechanism is formed; and
   a bracket member mounted on a top surface of said upper wall, said bracket member comprising a locking aperture, said lever further comprising a locking aperture, wherein said locking aperture of said lever aligns with said locking aperture of said bracket member when said lever is in said locked position such that a locking member may be inserted within said locking apertures to maintain said lever in said locked position.

3. A self-latching ball clamp coupler comprising:
   a housing having a top plate and sidewalls extending generally downwardly from the top plate to form a ball socket, the housing having a latching surface in communication with the top plate;
   an adjustment member extending through the top plate having a top portion extending above the top plate and a lower portion extending into the ball socket;
   a clamp member attached to the lower portion of the adjustment member, the clamp member being movable by the adjustment member between a lower locking position that retains a ball hitch within the socket and a raised open position that permits withdrawal of a ball hitch from the socket;
   an adjustment lever having a latching member, the adjustment lever pivotally connected to the top portion of the adjustment member such that the lever is selectively adjustable to move the adjustment member and clamp member between the lower locking position and the raised open position; and a biasing mechanism for biasing the clamp member towards the lower locking position, the biasing mechanism permitting the clamp member to move upwardly upon relative movement of a ball hitch from below the socket towards the top plate to permit a ball hitch to be inserted into the ball socket while said adjustment lever pivots about the adjustment member, engaging the latching member with the latching surface, the biasing mechanism further automatically moving the clamp member to the lower locking position upon complete insertion of a ball hitch into the socket while the adjustment lever latching member maintains engagement with the latching surface.

4. The self-latching ball clamp coupler of claim 3, wherein the latching member is pivotally mounted to the adjustment lever.

5. The self-latching ball clamp coupler of claim 3, wherein the adjustment lever includes a cam surface for bearing engagement with a top surface of the upper wall as the adjustment lever is rotated between the locking position and the open position; the cam surface being contoured to cause said upper portion of said adjustment member to move generally upwardly away from the top surface as the adjustment lever is rotated towards said open position.

6. The self-latching ball clamp coupler of claim 5 wherein the adjustment lever further includes a locking surface for engagement with the top surface of the upper wall to retain the adjustment lever in the open position.

7. The self-latching ball clamp coupler of claim 3, further comprising a rear wall mounted within the housing, the clamp member being in a bearing sliding relation with the rear wall.

8. The self-latching ball clamp coupler of claim 7, wherein the rear wall is mounted to angle generally upwardly and rearwardly from a bottom portion of the socket towards the top plate.

9. The self-latching ball clamp coupler of claim 7, further comprising a bottom wall, the bottom wall supporting said clamp member against downward movement when the clamp member is in said locked position.

10. A self-latching ball clamp coupler comprising:

a housing having a top plate and sidewalls extending generally downwardly from the top plate to form a ball socket;

an adjustment member extending through the top plate having a top portion extending above the top plate and a lower portion extending into the ball socket;

a clamp member attached to the lower portion of the adjustment member, the clamp member being movable by the adjustment member between a lower locking position that retains a ball hitch within the socket and a raised open position that permits withdrawal of a ball hitch from the socket;

a biasing mechanism for biasing the clamp member towards the lower locking position while said clamp member is maintained in the lower locking position, the biasing mechanism permitting the ball clamp to move upwardly upon relative movement of a ball hitch from below the socket towards the top plate to permit a ball hitch to be inserted into the ball socket, the biasing mechanism further automatically moving the ball clamp to the lower locking position upon complete insertion of a ball hitch into the socket; and further comprising a rear wall mounted within the housing, the clamp member being in a bearing sliding relation with the rear wall; and further comprising a bottom wall, the bottom wall supporting said clamp member against downward movement when the clamp member is in said locked position.

11. A self-latching coupling mechanism for coupling a towed vehicle to a ball hitch, the coupling mechanism comprising:

a housing having a generally downwardly facing socket for receiving the ball hitch, said housing further including an upper wall located generally above said socket, said upper wall having an opening formed therethrough;

a clamp rod slidably extending through said opening, said clamp rod including a bottom portion below said upper wall and an upper portion above said upper wall;

a clamp member having a tapered lower surface, said clamp member operably associated with said bottom portion of said clamp rod and movable between a locked position wherein said clamp member is extended downwardly into said socket to retain the ball hitch within the socket and an open position wherein said clamp member is positioned to permit movement of the ball hitch out of said socket;

a lever pivotally connected to said upper portion of said clamp rod such that said lever is selectively adjustable to move said clamp member between said locked position and said open position;

a biasing mechanism for biasing the clamp member toward the locked position while said lever is maintained in the locked position, the biasing mechanism permitting the clamp member to move upwardly upon relative movement of the ball hitch from below the socket towards the upper wall to permit the ball hitch to be inserted into the socket while said lever is maintained in the locked position, the biasing mechanism further automatically moving the clamp member to the lower locking position upon complete insertion of the ball hitch into the socket while said lever is maintained in the locked position, whereby the self-latching coupling mechanism is formed;

a rear wall mounted within said housing, said clamp member being in a bearing sliding relation with said rear wall a bottom wall, said bottom wall supporting said clamp member against downward movement when said clamp member is in said locked position.

* * * * *